(12) United States Patent
Seo et al.

(10) Patent No.: US 6,606,295 B1
(45) Date of Patent: Aug. 12, 2003

(54) DISC ACCOMODATING ADAPTOR AND A METHOD AND APPARATUS FOR DRIVING THE SAME

(75) Inventors: Young-sun Seo, Sungnam (KR); Dong-ho Shin, Seoul (KR); In-sik Park, Suwon (KR); Jung-wan Ko, Yongin (KR); Han-kook Choi, Suwon (KR); Jong-pil Park, Suwon (KR); Hee-deuk Park, Sungnam (KR); Kyu-hyeong Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/354,085

(22) Filed: Jul. 15, 1999

(30) Foreign Application Priority Data

| Jul. 15, 1998 | (KR) | 98-28661 |
|---|---|---|
| Sep. 9, 1998 | (KR) | 98-37103 |
| Oct. 8, 1998 | (KR) | 98-41974 |
| Nov. 9, 1998 | (KR) | 98-47822 |

(51) Int. Cl.[7] ............................................... G11B 5/84
(52) U.S. Cl. ..................................................... 369/289
(58) Field of Search ................................ 369/289, 291, 369/272, 77.2, 178; 360/133, 132, 137; 206/307, 309

(56) References Cited

U.S. PATENT DOCUMENTS

| 4,819,114 A | * | 4/1989 | Bernitt et al. ............... 360/133 |
| 4,969,140 A | | 11/1990 | Koiwa et al. ............... 369/77.1 |
| 5,187,700 A | | 2/1993 | Yoon ........................... 369/75.1 |

(List continued on next page.)

FOREIGN PATENT DOCUMENTS

| EP | 0 838 819 A1 | 4/1998 |
| EP | 0 294 884 A | 12/1998 |
| JP | 6-333356 | 12/1994 |
| JP | 9-282832 | 10/1997 |
| JP | 9-326178 | 12/1997 |
| JP | 10-3767 | 1/1998 |
| JP | 10-106205 | 4/1998 |
| JP | 10-106211 | 4/1998 |
| JP | 10-144031 | 5/1998 |
| JP | 11-232816 | 8/1999 |
| JP | 2000-67548 | 3/2000 |
| WO | WO97/11463 | 3/1997 |

OTHER PUBLICATIONS

Search Report (Communication) issued from the European Patent Office (issue date: Apr. 5, 2001, and including partial Search Report) with respect to European Patent Application No. 9930553.4 filed on Jul. 13, 1999.
First Office Action (issue date: Jan. 23, 2001) issued from the Japanese Patent Office with respect to Japanese Patent Application No. 11–196663 filed on Jul. 19, 1999.

*Primary Examiner*—David Hudspeth
*Assistant Examiner*—Angel Castro
(74) *Attorney, Agent, or Firm*—Staas & Halsey LLP (57) ABSTRACT

An adaptor includes a sensor hole to be open/closed, and a method and an apparatus drive the adaptor. The adaptor includes at least one sensor hole determining the size of a disc received in an adaptor body which is received via a disc holder. The disc holder includes an elastic press extended therefrom and elastically support the disc, preventing a movement of the disc until the disc holder is inserted into the adaptor body. Further, a release is disposed on the adaptor body to release the disc from the elastic press when the disc holder is inserted into the adaptor body. A method for driving the adaptor includes determining whether the sensor hole is open; and determining the type of device inserted into a disc drive. The type of drive inserted into the disc drive is determined by the adaptor accommodating an 8-cm disc when the sensor hole is open, while a cartridge accommodates a 12-cm disc when the sensor hole is closed. An apparatus for driving the adaptor includes a sensing switch to be selectively inserted into the sensor hole of the inserted adaptor to be turned on/off and transmit the corresponding signal regarding the open/closed state of the sensor hole to a microcomputer.

61 Claims, 7 Drawing Sheets

U.S. PATENT DOCUMENTS

| | | | |
|---|---|---|---|
| 5,499,233 A | * 3/1996 | Childers et al. | 369/291 |
| 5,548,571 A | * 8/1996 | Mistretta | 369/77.2 |
| 5,872,748 A | * 2/1999 | Shindo et al. | 369/38 |
| 5,923,630 A | * 7/1999 | Yoshida et al. | 369/77.2 |
| 5,982,734 A | * 11/1999 | Yamashita et al. | 369/178 |
| 5,991,261 A | * 11/1999 | Maeda et al. | 369/291 |
| 5,995,344 A | * 11/1999 | Fukuda et al. | 360/133 |
| 6,205,114 B1 | * 3/2001 | Takekoh et al. | 369/291 |
| 6,205,115 B1 | * 3/2001 | Ikebe et al. | 369/291 |
| 6,215,761 B1 | * 4/2001 | Goto et al. | 369/291 |

* cited by examiner

DISC ACCOMODATING ADAPTOR AND A METHOD AND APPARATUS FOR DRIVING THE SAME

CROSS-REFERENCE TO RELATED APPLICATIONS

This application is based upon and claims priority of Korean Patent Applications Nos. 98-28661 filed Jul. 15, 1998, 98-37103 filed Sep. 9, 1998, 98-41974 filed Oct. 8, 1998, and 98-47822 filed Nov. 9, 1998 the contents being incorporated herein by reference.

BACKGROUND OF THE INVENTION

1. Field of the Invention

The present invention relates to an adaptor, such as an adaptor for adapting a disc having an 8-cm diameter to be accommodated by a disc drive intended for a disc having a 12-cm diameter, and more particularly, to an adaptor which includes a sensor hole determining the size of the disc, and to a method and an apparatus for driving the adaptor.

2. Description of the Prior Art

Generally, optical discs are categorized roughly as discs having a diameter of 8-cm (hereinafter referred to as 8-cm discs) and discs having a diameter of 12-cm (hereinafter referred to as 12-cm discs). Usually, the discs of different diameters are used in disc drives intended exclusively to accommodate their respective sizes. Recently, however, adaptability of the disc drive has become the important factor which determines its marketability. Accordingly, a strong demand has arisen for using an 8-cm disc as well as a 12-cm disc in the disc drive intended only for use by 12-cm discs.

To meet such a demand, an adaptor has been developed. The adaptor includes a body having the same size as a 12-cm disc cartridge which accommodates the 12-cm disc, and a disc holder to hold the 8-cm disc into the body of the adaptor while supporting the 8-cm disc. Thus, when the 8-cm disc is fixed to the disc holder which is inserted and placed in the adaptor body, the 8-cm disc can be used in the 12-cm disc drive in the adaptor which has the same size and construction as the 12-cm disc cartridge.

Figure 1:
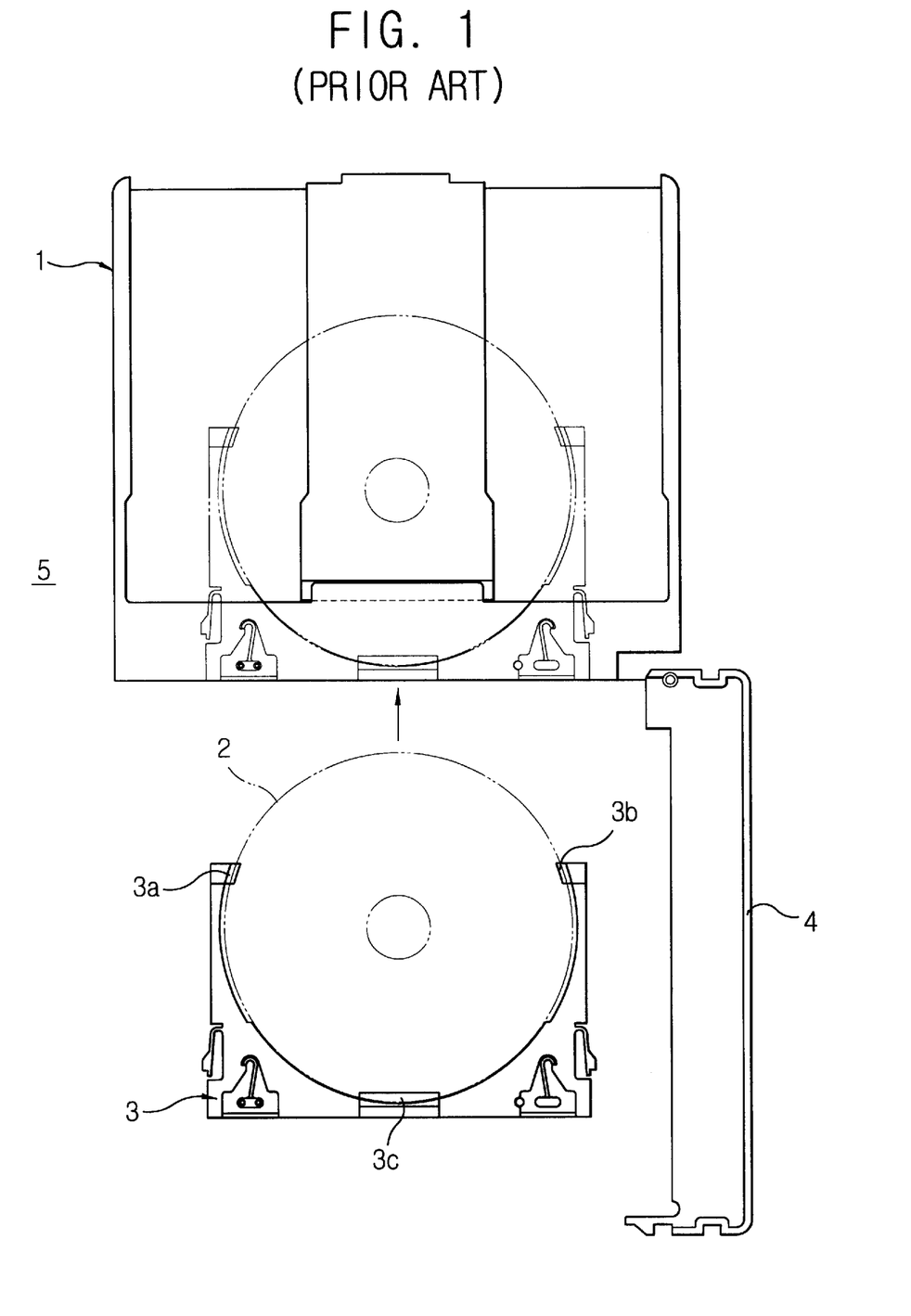
FIG. 1 is a plan view of a conventional disc accommodating adaptor.

One example of a conventional adaptor is shown in FIG. 1.

FIG. 1 is a plan view showing the construction of a conventional disc adaptor. In FIG. 1, element 1 is an adaptor body, element 2 is a disc, element 3 is a disc holder, and element 4 is a cover.

As shown in FIG. 1, the adaptor body 1 has the same size as a 12-cm disc cartridge. The disc holder 3 in which the disc 2 is fixed is inserted into the adaptor body 1. The adaptors have the same size and construction as the 12-cm disc cartridge. The only difference between the adaptors and the 12-cm disc cartridge is that the 8-cm disc is accommodated in the adaptors.

The disc holder 3 is formed with a first, second, and third support sections 3a, 3b, and 3c, respectively, for supporting the disc 2. The first, second, and third support sections 3a, 3b, and 3c, respectively, support the disc 2 from three points below the disc 2. When the disc holder 3 is inserted into the adaptor body 1 and the cover 4 is closed, the disc 2 is accommodated in the adaptor body 1.

The disc 2, when accommodated in the adaptor body 1, needs to be rotatable while the disc 2 is loaded on a turn table (not shown) of the disc drive. Accordingly, a predetermined gap between the disc holder 3 and the disc 2 should be maintained. Thus, the disc 2, which is supported by the first, second, and third support sections 3a, 3b, and 3c, is enabled to move.

Since the movement of the disc 2 is not restricted by the disc holder 3, however, the disc 2 may be separated from the disc holder 3 and fall while the disc holder 3 is being inserted or detached into/from the adaptor body 1. As a result, the disc 2 may be broken or damaged. Particulary when the disc 2 is separated from its intended position, i.e., when the disc 2 is in the wrong position while the turn table is driven, the information of the disc 2 may be severely damaged.

Further, since the conventional disc adaptor 5 has no structure or apparatus for determining the sizes or the status of the discs 2 in the disc drive, the information recording and/or reproducing process is occasionally lengthened.

Still further, the conventional disc drive has no apparatus for determining whether the device in the disc drive is an adaptor accommodating an 8-cm disc, or an 12-cm disc cartridge, when such a function is strongly required for rapid information recording and/or reproducing with respect to the respective discs. Accordingly, the time for recording and/or reproducing the information is lengthened.

SUMMARY OF THE INVENTION

The present invention has been developed to overcome the above-mentioned problems of the prior art.

An object of the present invention is to provide a disc accommodating adaptor for securely protecting a disc by restricting the movement of the disc when the disc is fixed in a disc holder, while releasing the disc when the disc holder is inserted into the adaptor body.

Another object of the present invention is to provide a disc accommodating adaptor including sensor holes and a sensor hole opening/closing controller so that the disc drive easily determines status information of the disc accommodated in the adaptor body. The status information includes the size, whether the disc has been verified or not, whether the disc has been certified or not, etc.

A further object of the present invention is to provide a method for driving the disc accommodating adaptor which includes the sensor holes and the sensor hole opening/closing controller.

Still another object of the present invention is to provide an apparatus for driving the disc accommodating adaptor which includes the sensor holes and the sensor hole opening/closing controller according to the method thereof.

To accomplish the above-mentioned objects, the present invention provides a disc accommodating adaptor which includes an adaptor body, and a disc holder inserted into the adaptor body supporting a disc. An elastic press is extended from the disc holder, and elastically supports the disc to prevent a movement of the disc until the disc holder is inserted into the adaptor body. Additionally, a release is provided in the adaptor body to release the disc from the elastic press when the disc holder is inserted into the adaptor body.

The elastic press is formed on opposite sides of the disc holder to press the disc toward a center of the disc.

The release includes a projection integrally formed on an leading edge of the elastic press, and an intervening member which is disposed in the adaptor body. The intervening member pushes the projection outward by slidably contacting with the projection when the disc holder is inserted into the adaptor body, to push the elastic press which is pressing the disc toward opposite sides of the disc.

The disc accommodating adaptor according to a preferred embodiment of the present invention includes an adaptor body, a disc holder inserted into the adaptor body supporting a disc, an elastic press extended from the disc holder elastically supporting the disc to prevent the movement of the disc until the disc holder is inserted into the adaptor body, a release releasing the elastic press when the disc holder is inserted into the adaptor body, a lock holding the disc holder in a predetermined position with respect to the adaptor body; and an unlocker unlocking the disc holder from the adaptor body.

The lock includes a pair of elastic locking projections disposed on opposite sides of the disc holder to be elastically biased outward, and a pair of locking recesses defined in the adaptor body to correspond with the pair of elastic locking projections, respectively.

The unlocker includes a pair of pressing members having protrusions to contact with the elastic locking projections of the disc holder after passing through the locking recesses, respectively.

The disc accommodating adaptor according to another preferred embodiment of the present invention includes a gripping section formed on the disc holder, and an opening defined on the front side of the adaptor body. As a result, the gripping section is positioned outside of the adaptor body. Accordingly, the user is able to detach the disc holder from the adaptor body easily, by simply gripping and pulling out the gripping section of the disc holder while pressing the pressing members which are formed on opposite sides of the adaptor body. Additionally, an imprinted part may be formed on the gripping section to indicate the side one and the other side of the disc.

Accordingly, the disc is turned to be rotatable or restricted in movement, in response to the inserting or withdrawing actions of the disc holder with respect to the adaptor body, so that the disc may not be separated unexpectedly when replaced.

Further, since the possibility of inserting the wrong side of the disc into the adaptor is decreased, the damages to the disc caused by inserting wrong side of the disc are prevented.

Another object of the present invention is accomplished by providing a disc accommodating adaptor which includes at least one sensor hole used for determining the size of the disc accommodated in the adaptor body via the disc holder. The sensor hole may be one of either A1, A2, A3 sensor holes, or a recording prevention hole suggested by the DVD-RAM standard. Further, the sensor hole may be a combination of sensor holes from the A1, A2, A3 sensor holes, and the recording prevention hole. Also, the sensor hole may be an additional separate hole.

The disc accommodating adaptor according to a first preferred embodiment of the present invention further includes a controller controlling the opening/closing of the sensor hole according to the size of the disc.

The disc accommodating adaptor according to another preferred embodiment of the present invention includes an adaptor body, a disc holder inserted into the adaptor body supporting a disc, an elastic press extended from the disc holder elastically supporting the disc to prevent a possible movement of the disc until the disc holder is inserted into the adaptor body, a release releasing the elastic press when the disc holder is inserted into the adaptor body, a lock holding the disc holder in a predetermined position with respect to the adaptor body, a plurality of sensor holes used for determining the status of the disc which is received in the adaptor body, a controller selectively opening/closing the sensor holes according to the determined size and status of the disc, and an unlocker unlocking the disc holder from the adaptor body.

The sensor holes include an A1 sensor hole used for determining whether to proceed to the recording surface verifying process of the disc when the recording process is performed, an A2 sensor hole used for determining whether the disc is single-sided or double-sided, an A3 sensor hole used for determining the size of the disc, and an information prevention hole used for determining whether the information prevention function has been selected. Initially, the A1 and A3 sensor holes are in the open state, while the A2 sensor hole and the information prevention hole are in the closed state. Using the forgoing holes, a disc drive of the present invention determines whether the disc is a recordable disc having a diameter of 8-cm which requires the recording surface verification process.

The sensor hole opening/closing controller may be formed at the A1 sensor hole, A2 sensor hole and/or the information prevention hole, respectively. The sensor hole opening/closing controller includes a pair of movement rails formed in the adaptor body, inclusive of the sensor hole, an opening/closing member slidably disposed in the movement rail to selectively open/close the sensor hole, and a holder holding the opening/closing member in a position to which the opening/closing member is moved.

The position holder includes a position holding projection protruded from an upper one side of the opening/closing member, and a first and second position holding grooves, defined in the adaptor body, receiving the position holding projection, the first and second position fixing grooves being spaced apart from each other by a predetermined distance which corresponds with a traveling stroke of the opening/closing member.

According to another preferred embodiment of the present invention, the size and status of the recordable surface of the disc can be rapidly and easily determined by a plurality of sensor holes, and the user is enabled to use the disc drive more efficiently within a relatively shorter period of time because the user may not select unnecessary steps such as the verification process, etc. but may directly proceed with the information recording process by manually opening/closing the sensor holes according to such a determined status of the disc.

A further object is accomplished by providing a method for driving an adaptor accommodating a recordable/reproducible disc according to the present invention. The forgoing method of the present invention includes the steps of determining whether a disc size determining sensor hole of the inserted adaptor is opened, and determining that the adaptor accommodating a disc of an 8-cm diameter is inserted when the disc size determining sensor hole is opened, while determining that a cartridge accommodating a disc of a 12-cm diameter is inserted when the disc size determining sensor hole is closed.

Another of the objects of the present invention is accomplished by providing an apparatus for driving an adaptor accommodating a recordable/reproducible disc. The apparatus of the present invention includes a sensing switch to be selectively inserted into a disc size determining sensor hole of the inserted adaptor so as to be turned on/off and to transmit corresponding signals regarding open/closed states of the disc size determining sensor hole to a microcomputer. After determining whether a disc size determining sensor hole of the inserted adaptor is open, it is determined that the adaptor accommodating a disc of an 8-cm diameter is inserted when the disc size determining sensor hole is opened, or that a cartridge accommodating a disc of a 12-cm diameter is inserted when the disc size determining sensor hole is closed. Accordingly, the disc drive prepares the information recording and/or reproducing process according to the status of the disc determined via the disc size determining sensor hole.

Additional objects and advantages of the invention will be set forth in part in the description which follows and, in part, will be obvious from the description, or may be learned by practice of the invention.

BRIEF DESCRIPTION OF THE DRAWINGS

The above objects and advantages will be more apparent by describing the present invention with reference to the accompanied reference drawings, in which:

FIGS. 3A and 3B are views showing a process of inserting and fixing a disc holder into the adaptor body shown in FIG. 2, wherein FIG. 3A shows the moment that the disc holder is inserted, and FIG. 3B shows the situation that the insertion of the disc holder is completed;

FIGS. 5A and 5B are sectional views taken on line I—I of FIG. 4, for showing an operation of the sensor hole and sensor hole opening/closing means as the main aspect of the disc accommodating adaptor according to another preferred embodiment of the present invention, wherein FIG. 5A shows when the sensor hole is opened, and FIG. 5B shows when the sensor hole is closed;

DETAILED DESCRIPTION OF THE PREFERRED EMBODIMENT

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
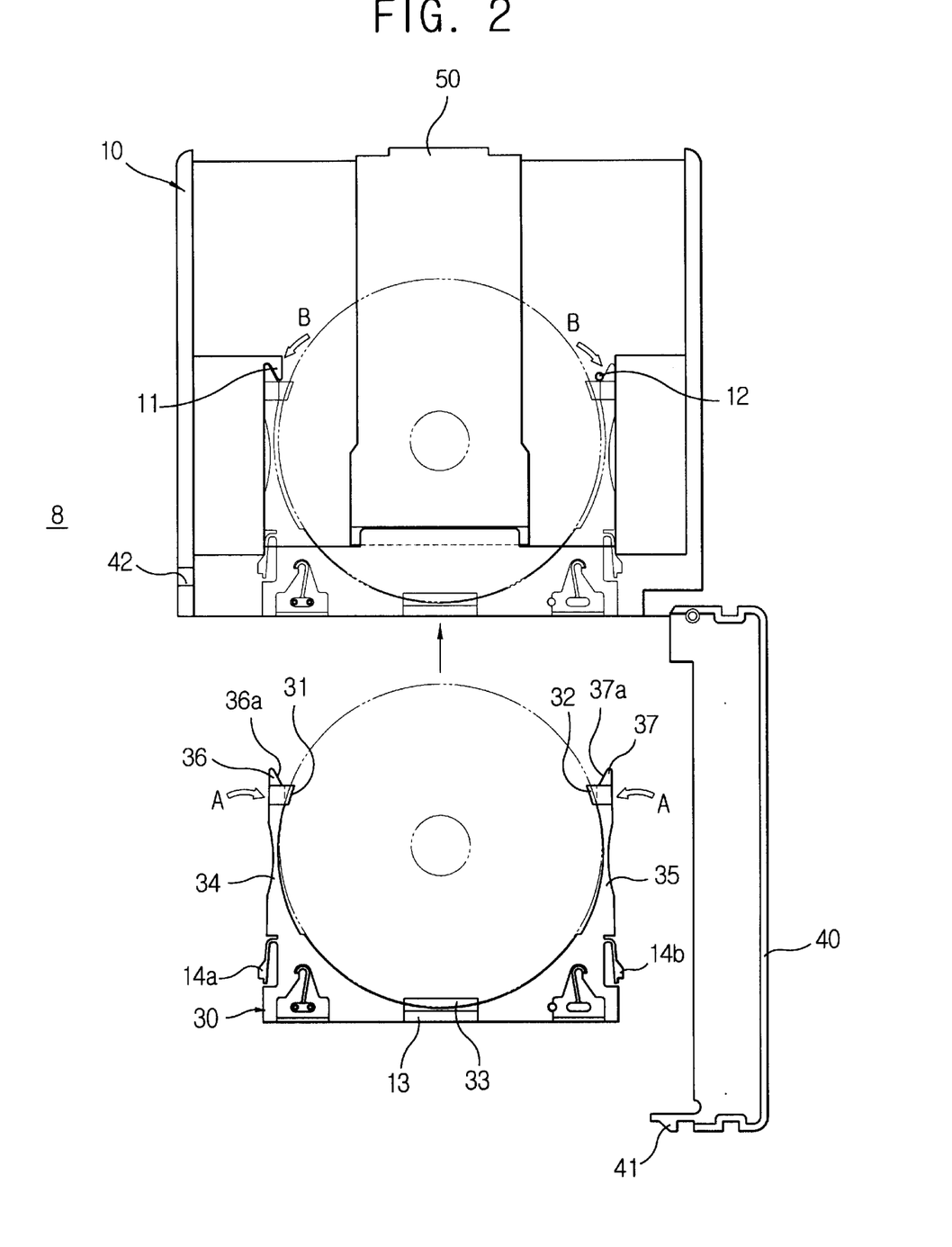
FIG. 2 is a plan view of the disc accommodating adaptor according to a preferred embodiment of the present invention.

FIG. 2 shows a disc accommodating adaptor 8 according to the present invention. Referring to FIG. 2, a disc holder 30 includes a first support section 31, a second support section 32, and a third support section 33, by which a disc 20 is supportably positioned. Accordingly, the disc 20 is positioned on the supporting sections 31, 32, and 33 from three points. Although FIG. 2 shows the disc 20 supported by the disc holder 30 being supportably positioned by the three supporting sections 31, 32, and 33, the disc 20 may be supported by a supporting rib which has a groove for receiving the edge of the disc 20. In this case, the supporting rib is formed along the disc supporting sections of the disc holder 30.

Also, a first elastic press section 34 and a second elastic press section 35 are extended from the disc holder 30 to elastically press the disc 20 toward the center of the disc 20 from opposite sides of the disc 20. The elastic press sections 34 and 35 are elastically displaceable and continue elastically biasing the disc 20 until an external force is exerted thereto. Accordingly, the disc 20 is fixedly supported by the first and second elastic press sections 34 and 35, once the disc 20 is positioned on the disc holder 30.

Meanwhile, if the disc holder 30 is inserted and fixed in the adaptor body 10, the disc 20 still must be rotatable. Accordingly, a release releasing the first and second elastic press sections 34 and 35 is required.

The release comprises a first projection 36 and a second projection 37, which are integrally formed on ends of the first and second elastic press sections 34 and 35, respectively. The release further comprises first and second intervening members 11 and 12 which are disposed in the adaptor body 10. The first and second projections 36 and 37 have inclined surfaces 36a and 37a which have a predetermined degree of inclination. Also, the first and second intervening members 11 and 12 are in wedge and cylindrical shapes, respectively, which can slidably contact with the inclined surfaces 36a and 37a of the first and second projections 36 and 37. Here, the shape of the intervening members 11 and 12 may be identical, or as shown in the preferred embodiment of the present invention, the intervening members 11 and 12 may have different shapes, respectively.

In the figures, the reference numeral 13 refers to a gripping section with which the user can grip the disc holder 30, and reference numerals 14a and 14b refer to locking projections. Symbols or characters may be imprinted on the gripping section 13 to indicate one side or another of the disc 20. When the disc holder 30 is fixed into the adaptor body 10, the locking projections 14a and 14b come in close contact with both inner sidewalls of the adaptor body 10.

Further, in the figures, the reference numeral 40 refers to a cover of the adaptor body 10. By closing the cover 40, the disc holder 30 which is inserted into the adaptor body 10, is securely fixed in the adaptor body 10. More specifically, when the user rotatably closes the cover 40 with respect to the adaptor body 10, a lock 41 which is formed on one end of the cover 40 is locked into a locking hole 42 which is defined on the adaptor body 10.

Also, in the figures, reference numeral 50 refers to a shutter. The shutter 50 is to selectively open/close a spindle opening and an extended opening (not shown) which are defined on the adaptor body 10. The shutter 50 is slidably disposed on the adaptor body 10. Thus, when the adaptor is inserted into the disc drive, the shutter 50 is automatically opened by shutter opening/closing means of the disc drive. Accordingly, some portion of the disc 20 accommodated in the adaptor body 10 is exposed so that an optical pickup may access the disc 20.

Figure 3A:
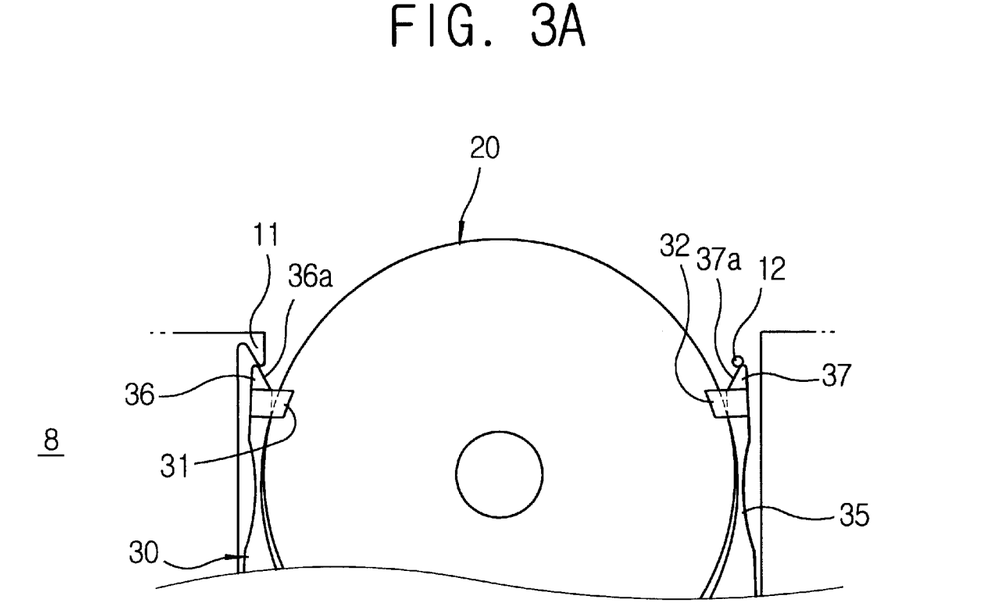
Figure 3B:
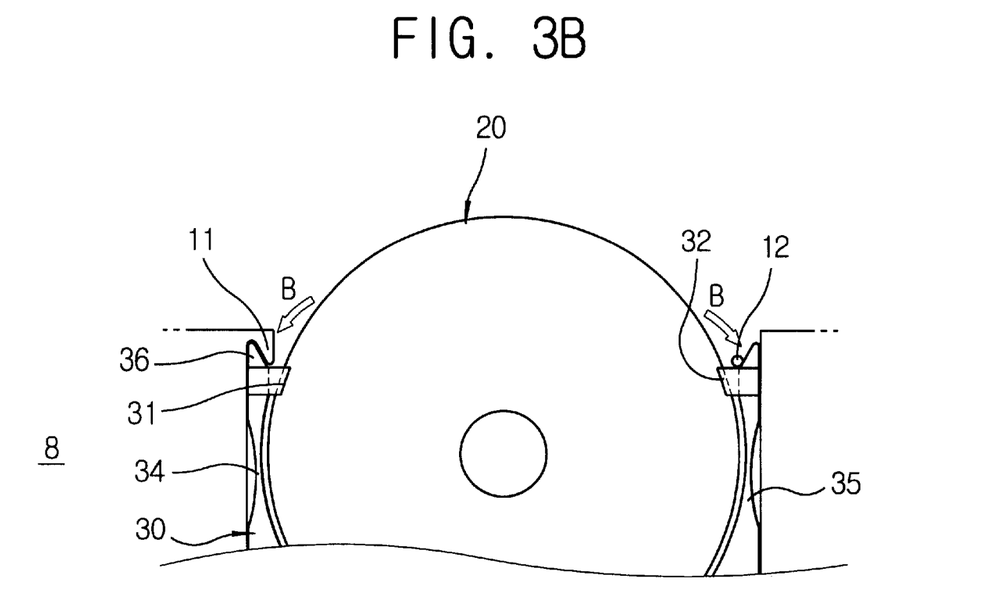

According to the adaptor 8 constructed as described above, until the disc holder 30 is fixed into the adaptor body 10, the first and second elastic press sections 34 and 35 of the disc holder 30 keep elastically pressing the disc 20 toward the center of the disc 20 in a direction indicated by the arrows 'A' in FIG. 2, so that the disc 20 does not move in the disc holder 30. Then, as the disc holder 30 is inserted into the inner portion of the adaptor body 10, as shown in FIG. 3A, leading edges of the first and second projections 36 and 37 come in contact with the first and second intervening members 11 and 12. In such a situation, as the disc holder 30 is inserted further into the inner portion of the adaptor body 10, as shown in FIG. 3B, the first and second projections 36 and 37 slidably contact with the first and second intervening members 11 and 12, and are pushed so that the first and second elastic press sections 34 and 35 which have been pressing the disc 20 are spaced apart from each other in the direction indicated by the arrows 'B' in FIG. 3B. Accordingly, the disc 20 is released from the first and second elastic press sections 34 and 35, and is enabled to be moved without being impeded by the neighboring elements. In reverse order, when the disc holder 30 is withdrawn from the adaptor body 10, the first and second elastic press sections 34 and 35 are returned by the restoring force thereof to press the disc 20 toward the center of the disc 20. Accordingly, the disc 20 is not moved once the disc holder 30 is withdrawn from the adaptor body 10.

As described herein above, since the disc 20 is automatically turned to be restricted or rotatable in response to the inserting or withdrawing action of the disc holder 30 with respect to the adaptor body 10, the disc 20 is not separated unexpectedly from the disc holder 30.

Figure 4:
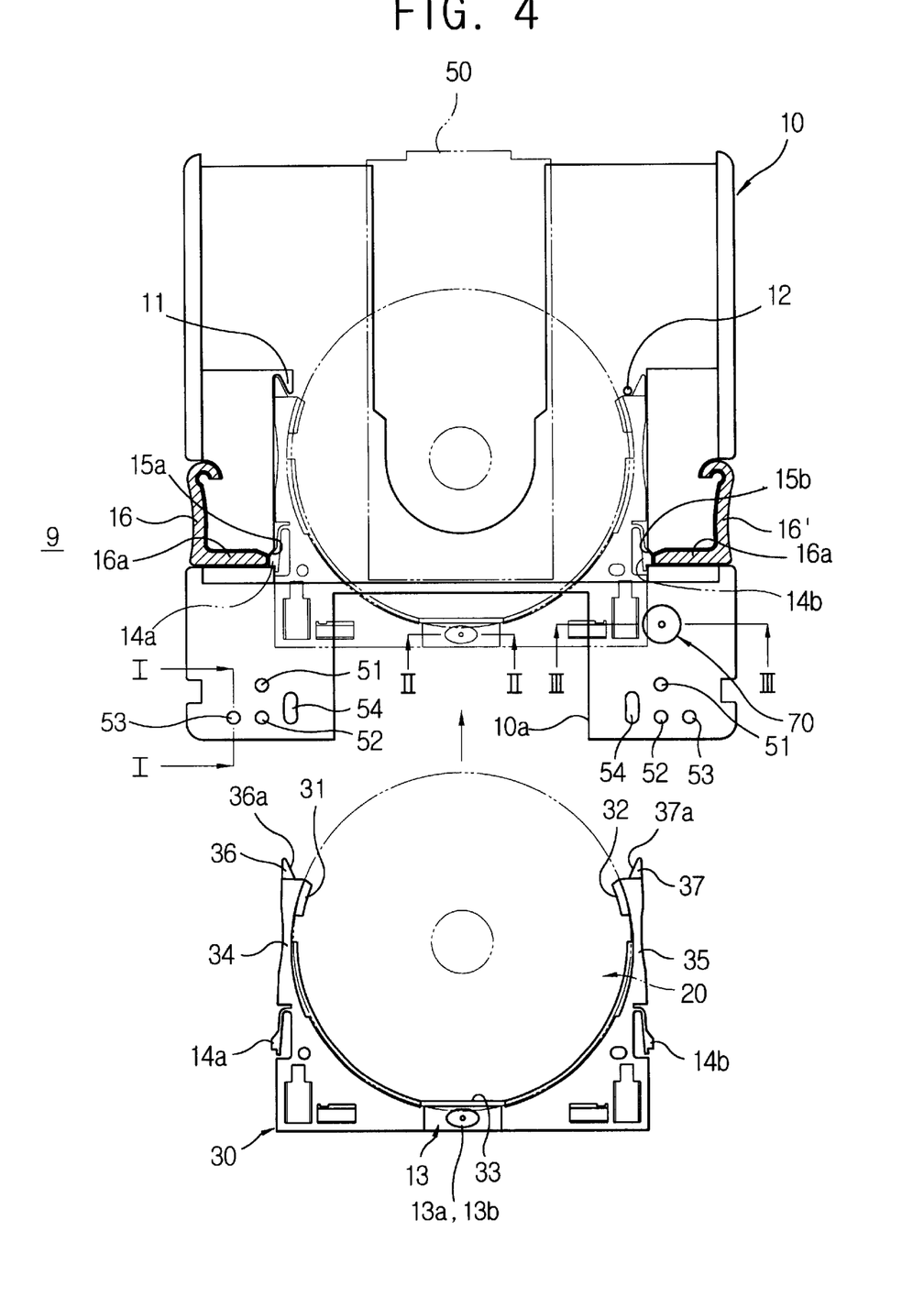
FIG. 4 is a plan view of the disc accommodating adaptor having sensor holes for determining the status of the disc according to another preferred embodiment of the present invention.
Figure 5A:
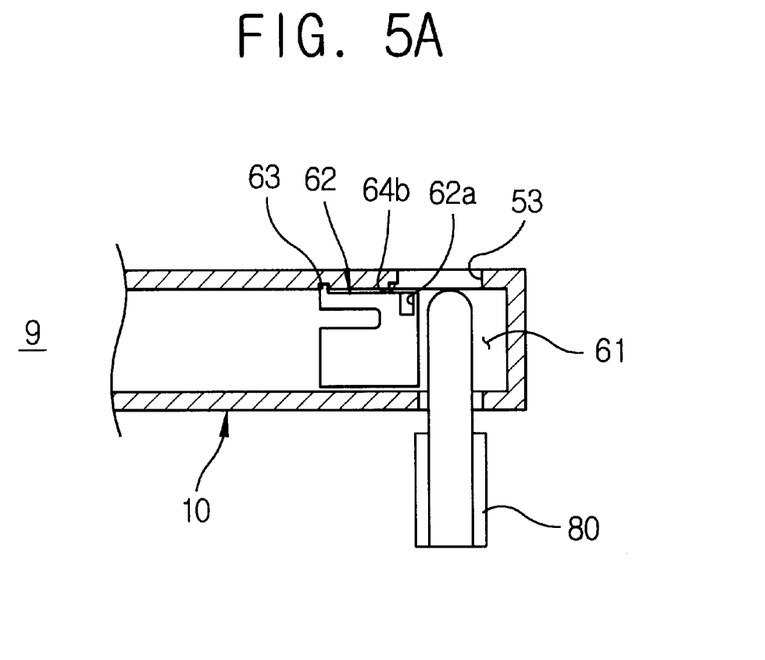
Figure 5B:
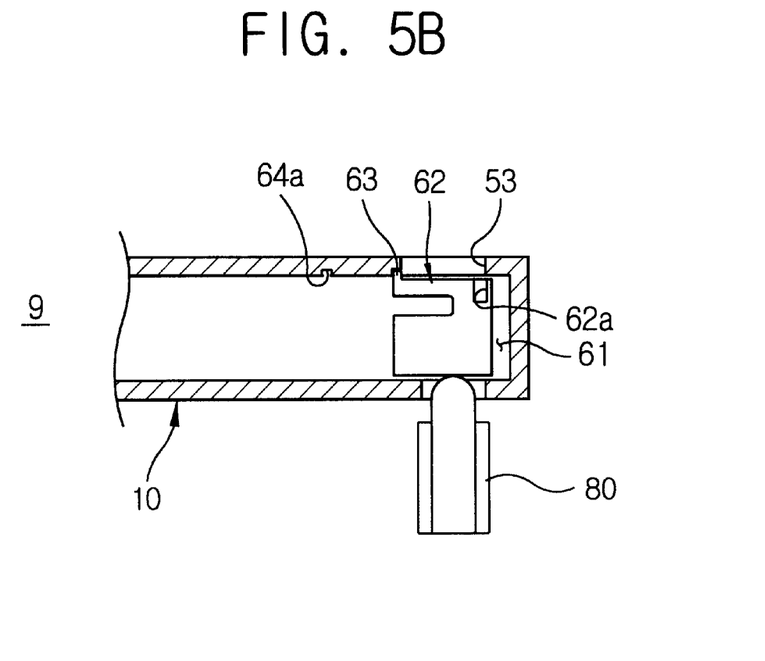
Figure 6:
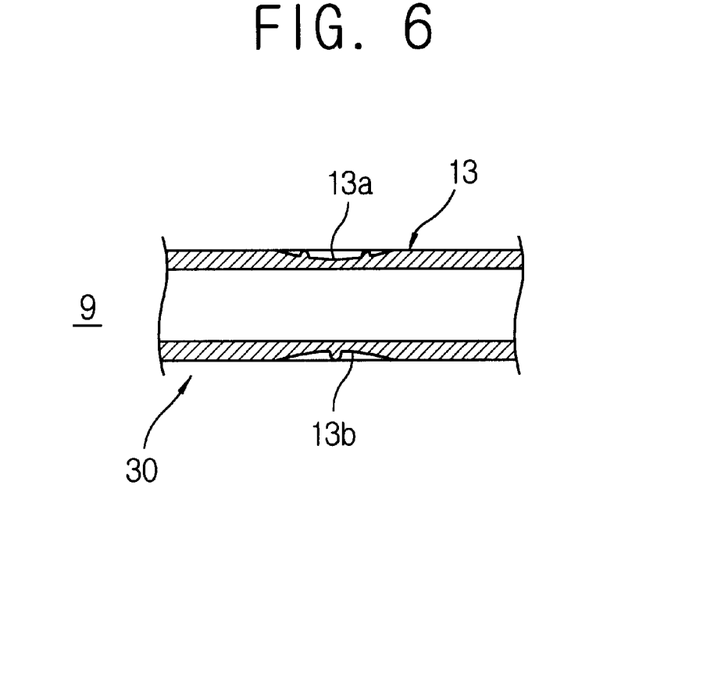
FIG. 6 is a sectional view taken on line II—II of FIG. 4 for showing a gripping section of the disc holder.
Figure 7:
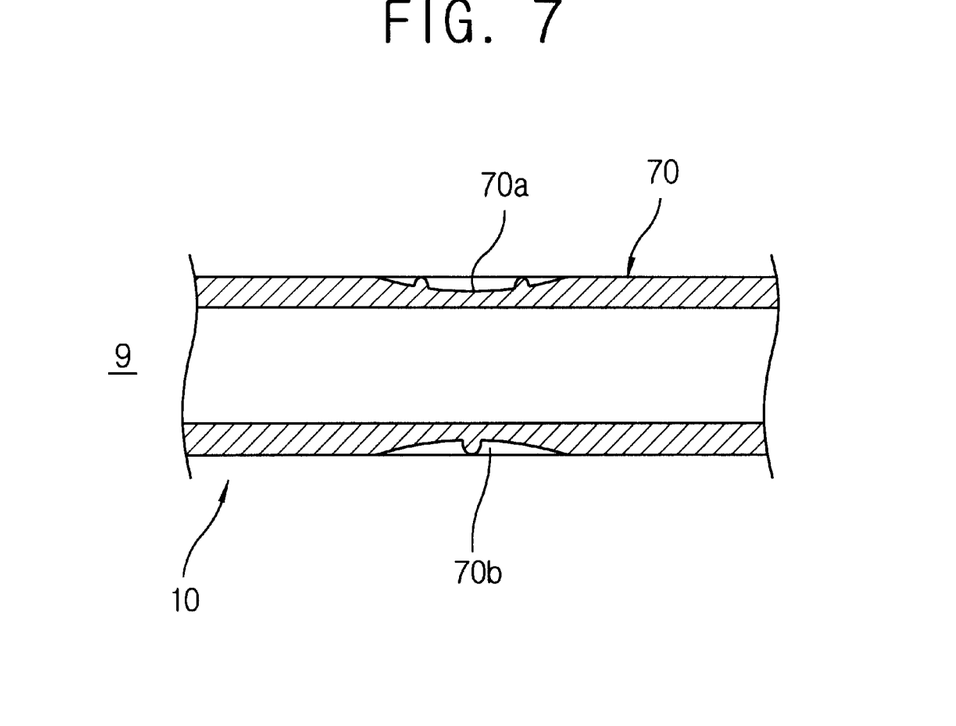
FIG. 7 is a sectional view taken on line III—III of FIG. 4 for showing an indicating section of the adaptor body.

Meanwhile, FIG. 4 is a plan view of a disc accommodating adaptor 9 according to another preferred embodiment of the present invention. FIGS. 5A and 5B are sectional views taken on line I—I of FIG. 4 and show the construction and operation of the sensor hole opening/closing controller, which is the main feature of this preferred embodiment of the present invention. Further, FIGS. 6 and 7 are sectional views taken on lines II—II and III—III of FIG. 4, respectively.

As shown in the figures, the disc accommodating adaptor 9 according to this preferred embodiment of the present invention has the same basic construction as the adaptor 8 according to the first preferred embodiment of the present invention. Accordingly, the detailed description of the construction of the adaptor 9 according to this preferred embodiment of the present invention will be omitted, but the unique feature thereof will be described hereinafter while the similar elements are given the same reference numerals of the first preferred embodiment throughout.

As shown, the disc accommodating adaptor 9 according to another preferred embodiment of the present invention includes a box-shaped adaptor body 10, a disc holder 30, a pair of elastic press members 34 and 35, a first and second projections 36 and 37, and a first and second intervening members 11 and 12. The disc 20 is fixed in the disc holder 30 and the disc holder 30 is inserted into the adaptor body 10 while accommodating and thereby supporting the disc 20. The pair of elastic press members 34 and 35 which are elastically displaceable are extended from the disc holder 30 to elastically support the disc 20. The first and second projections 36 and 37 are integrally formed on the ends of the elastic press members 34 and 35, respectively. The first and second intervening members 11 and 12 are disposed in the adaptor body 10 to force the pair of elastic press members 34 and 35 of the disc holder 30 toward the opposite sides of the disc 20 and to release the disc 20, by slidably contacting with the pair of first and second projections 36 and 37, when the disc holder 30 is inserted into the adaptor body 10.

Further, the adaptor 9 according to this preferred embodiment of the present invention includes a holder locker and a holder unlocker. The holder locker holds the disc holder 30 in a predetermined position after the disc holder 30 is inserted into the adaptor body 10, while, the holder unlocker unlocks the disc holder 30 which is locked by the holder locker.

The holder locker includes a pair of elastic locking projections 14a and 14b and a pair of locking recesses 15a and 15b. The pair of elastic locking projections 14a and 14b are disposed on opposite sides of the disc holder 30 in a manner that the elastic locking projections 14a and 14b are elastically biased outward. The pair of locking recesses 15a and 15b are defined on the adaptor body 10, to receive the pair of elastic locking projections 14a and 14b, respectively. Accordingly, when the disc holder 30 is inserted into the adaptor body 10, the elastic locking projections 14a and 14b on the opposite sides of the disc holder 30 are locked into the locking recesses 15a and 15b which are formed on the respective inner walls of the adaptor body 10, and never to be separated from the locking recesses 15a and 15b without an external force exerted thereto.

Further, the holder unlocker includes a pair of pressing members 16 and 16' which are formed on opposite sides of the adaptor body 10. The pressing members 16 and 16' have protrusions 16a, respectively, which pass through the locking recesses 15a and 15b of the adaptor body 10 to come in contact with the elastic locking projections 14a and 14b of the disc holder 30. Accordingly, when the pressing members 16 and 16' are pressed inward in a lateral direction of the adaptor body 10, the protrusions 16a consequentially push the pair of elastic locking projections 14a and 14b of the disc holder 30. As a result, the pair of elastic locking projections 14a and 14b are separated from the locking recesses 15a and 15b of the adaptor body 10. At the same time, as the user grips and pulls the gripping section 13 of the disc holder 30, the disc holder 30 is detached from the adaptor body 10.

Further, according to this preferred embodiment of the present invention, an opening 10a is defined on the front side of the adaptor body 10, so that the gripping section 13 is positioned outside the adaptor body 10. As a result, the disc holder 30 is inserted and withdrawn into/from the adaptor body 10 more easily. Also, imprinted parts 13a and 13b are formed on the gripping section 13 to indicate respective sides of the disc, while upper and lower surface indicating part 70 are formed on one side of the adaptor body 10. The upper and lower surface indicating part 70 has another imprinted parts 70a and 70b for indicating upper and lower surfaces of the adaptor body 10, respectively. Accordingly, the user may insert/withdrawn the disc or the disc holder 30 with respect to the adaptor body 10 easily without confusion in distinguishing each side.

Still further, the disc accommodating adaptor according to this preferred embodiment of the present invention includes a plurality of sensor holes 51, 52, 53, and 54 which are defined on the adaptor body 10 in predetermined positions. As sensing switches 80 which are provided to the disc drive are selectively inserted into the sensor holes 51, 52, 53, and 54, the status of the disc 20 are determined.

The sensor holes 51, 52, 53, and 54 include an A1 sensor hole 51, an A2 sensor hole 52, an A3 sensor hole 53, and a recording prevention hole 54. The A1 sensor hole 51 is used for determining whether the recording surface of the disc 20 should be verified, and the A2 sensor hole 52 is used for determining whether the disc 20 is single-sided or double-sided. The A3 sensor hole 53 is used for determining whether the size of the disc 20 is 8-cm, and the recording prevention hole 54 is used for determining whether the information recording prevention function has been selected.

When the A1 sensor hole 51 is open, the corresponding sensing switch 80 is inserted thereto, so that it is determined that the disc 20 has been used in the disc drive at least once. In such a case, the information is recorded onto the disc 20 while the verification is carried out simultaneously. Otherwise, i.e, when the A1 sensor hole 51 is closed, then it is determined that the disc 20 has been never used in the disc drive, so that the information is recorded on the disc without the verification process.

In a similar manner, when the A2 sensor hole 52 is closed, then the disc 20 is determined to be single-sided, and if not, the disc 20 is determined to be double-sided. Further, when the A3 sensor hole 53 is opened, then it is determined that the device inserted in the disc drive is the adaptor 9 accommodating the 8-cm disc, and if not, it is determined that the device inserted in the disc drive is the general disc accommodating cartridge such as a 12-cm disc cartridge, or the like.

Further, when the recording prevention hole 54 is closed, it is determined that the recording process is available, while, if not, i.e. when the recording prevention hole 54 is open, it is determined that the information recording prevention function has been selected.

Initially, according to the adaptor 9 of this preferred embodiment, the A1 sensor hole 51 and A3 sensor hole 53 are in an open-state, while A2 sensor hole and the recording prevention hole 54 are in a closed-state. Accordingly, when the adaptor 9 is inserted into the disc drive, it is determined that an 8-cm recordable disc which requires the verification process is inserted.

In such a situation, even if the disc 20 accommodated in the adaptor is a new disc or if the disc 20 accommodated in the adaptor 9 is one that does not require the verification process, since the A1 sensor hole 51 is opened, inconvenience arises in that the verification process is still carried out in the disc drive before information recording occurs. As a result, the information recording time is lengthened.

According to this preferred embodiment, to prevent this inconvenience, the user may open/close the A1 sensor hole 51, manually. Accordingly, when the user determines that there is no need for the verification process, then he/she may block the A1 sensor hole 51 so as to directly proceed to the information recording process.

The sensor hole opening/closing controller may be constructed at the A2 and A3 sensor holes 52 and 53, respectively, in addition to the A1 sensor hole 51.

An example of the adaptor 9 in which sensor hole opening/closing controller adapted to the A3 sensor hole 53 will be described with respect to FIGS. 5A and 5B. The A3 sensor hole 53 is used for determining the size of the disc 20.

As shown in FIGS. 5A and 5B, the sensor hole opening/closing controller includes a moving rail 61, an opening/closing member 62, and position holder. The moving rail 61 is formed in the adaptor body 10 in a manner that the moving rail 61 includes the A3 sensor hole 53. The opening/closing member 62 is slidably disposed within the moving rail 61, to selectively open/close the A3 sensor hole 53. The position holder fixes the opening/closing member 62 in the place to which the opening/closing member 62 is moved.

The position holder includes a position holding projection 63, and first and second position holding grooves 64a and 64b receiving the position holding projection 63. The position holding projection 63 protrudes from the upper side of the opening/closing member 62. The first and second position holding grooves 64a and 64b are defined in the adaptor body 10, in a manner that the distance therebetween corresponds with the traveling stroke of the opening/closing member 62.

Moving groove 62a is also defined on the upper side of the opening/closing member 62, moving the opening/closing member 62.

By the construction of the present invention described above, the user selectively opens/closes the A1, A2, A3 sensor holes 51, 52, 53, and/or the recording prevention hole 54 so that he/she controls the status determining processes.

Referring to FIG. 5A, the A3 sensor hole 53 is open. Accordingly, when the adaptor 9 is inserted into the disc drive, the corresponding sensing switch 80 is inserted into the A3 sensor hole 53, and accordingly, the disc drive determines that the adaptor 9 is accommodating an 8-cm disc 20.

Referring to FIG. 5B, by contrast, the A3 sensor hole 53 is closed by the open/closing member 62. Accordingly, it is determined that the disc cartridge other than an 8-cm disc cartridge, such as a 12-cm disc cartridge, etc. is inserted.

In such a situation, if the user wishes to move the opening/closing member 62, he/she moves the opening/closing member 62 while pressing the opening/closing member 62 with a pointed member such as a ballpoint pen, or the like, through the moving groove 62a which is defined on the upper side of the opening/closing member 62. Accordingly, the position holding projection 63 of the opening/closing member 62 is separated from the first position holding recess 64a so that the opening/closing member 62 is moved to the desired position. Then, as the position holding projection 63 of the opening/closing member 62 is inserted into the second position holding recess 64b of the adaptor body 10, the opening/closing member 62 is fixed in the place to where it is moved.

Albeit not shown in the drawings, it would be easily understood that the mechanisms to open/close the A1 sensor hole 51 and the recording prevention hole 54 are the same as above.

Further, the operation and the effect of the disc holder 30 described herein above, which is to insert or withdraw the disc 20 into/from the adaptor body 10, are the same as that of the disc holder 30 according to the first preferred embodiment of the present invention in which the disc 20 is fixedly supported by the elastic press section of the disc holder 30, or the disc 20 is released by the release to be rotated without being impeded.

Figure 8:
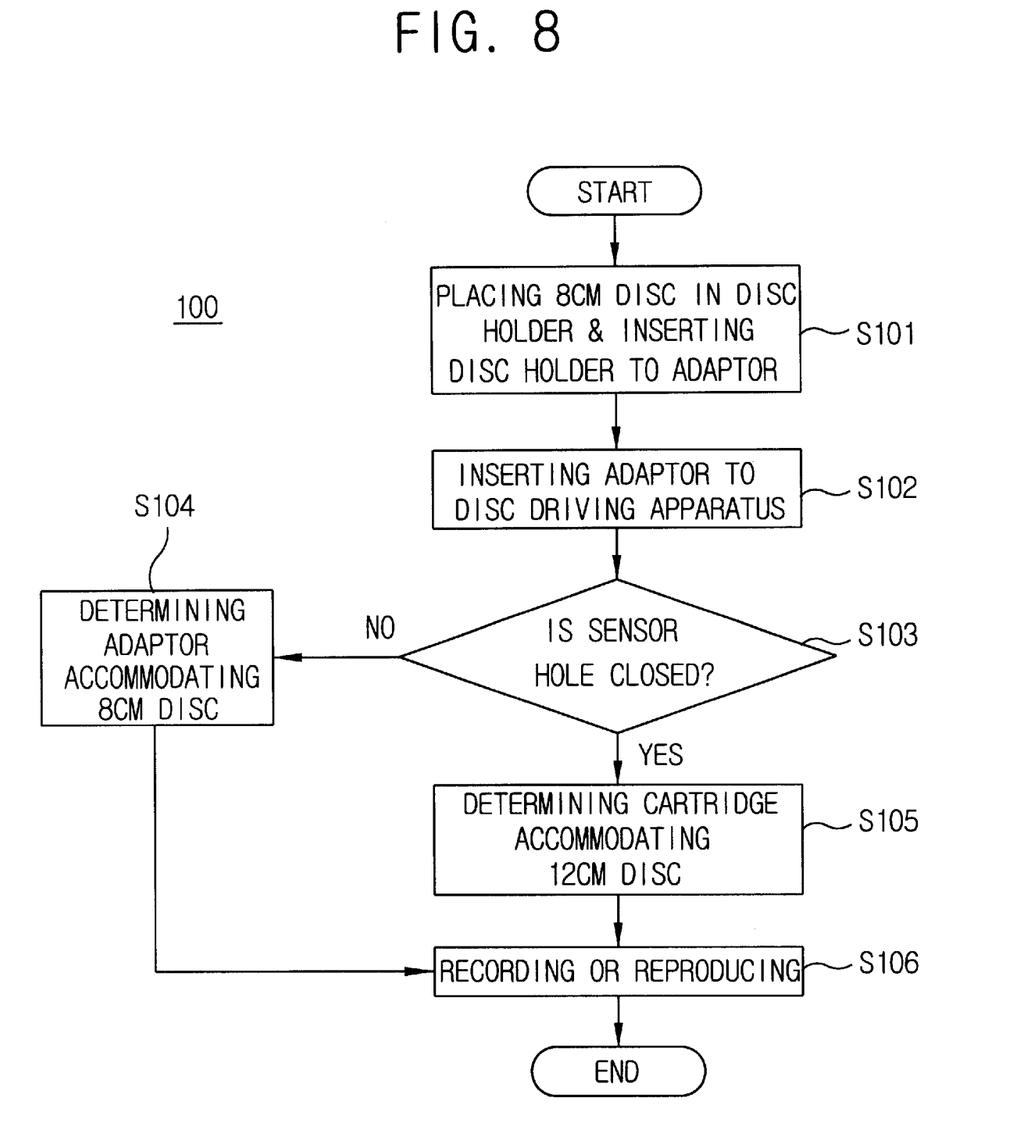
FIG. 8 is a flow chart for explaining the method for driving the disc accommodating adaptor which has the sensor hole for determining especially the size of disc according to the preferred embodiment of the present invention.

Hereinafter, a method for driving the adaptor 9 which has the above-described sensor holes 51, 52 and 53, and particularly the adaptor 9 which has the disc size sensor hole 53 will be described with respect to the flow chart 100 of FIG. 8.

First, the 8-cm disc is placed in the adaptor 9 by the disc holder 30 (Step S101), then the adaptor 9 is inserted into the disc drive (Step S102). Then, it is determined whether or not the sensor hole 53 for size determination is in the open-state (Step S103).

In Step S103, if the disc size sensor hole 53 is in the open-state, then it is determined that the adaptor 9 accommodating the 8-cm disc is inserted (Step S104). While, if in the closed-state, it is determined that the 12-cm disc cartridge is inserted into the disc drive (Step S105). After that, the information recording and/or reproducing process is carried out (Step S106).

Here, the step for determining whether or not the disc size sensor hole 53 is in the open-state is carried out by the sensing switch 80 which is provided to the disc drive. More specifically, the sensing switch 80 is selectively inserted into the disc size sensor hole 53 which is provided to the adaptor 9 so as to be turned 'on/off', and the corresponding signal is transmitted to a microcomputer.

As described above, according to the disc accommodating adaptor 9 of the present invention, the disc is fixedly supported when the disc is positioned on the disc holder 30 so that the disc 20 is not moved, while the disc 20 is released when the disc holder 30 is completely inserted into the adaptor body 10 so that the disc 20 is rotated smoothly. As a result, the disc 20 does not incur the damages which may be caused by the separation of the disc 20 from the right position.

Further, according to the disc accommodating adaptor 9 of the present invention, the size and status of the disc, or the like are easily determined, and the user is enabled to open/close the sensor holes 51, 52 and 53 manually as he/she wishes, according to the determined size and status of the disc 20, so that the user may shorten the information recording time by not selecting unnecessary processes such as the verification process, or the like. Accordingly, less time is taken to record the information.

Still further, according to the disc accommodating adaptor 9 of the present invention, the upper and lower surface of the adaptor and both sides of the disc 20 can be easily distinguished through the indicating parts which are provided to the disc holder 30 and the adaptor body 10, so that the user can insert the right side of the disc 20 or the disc holder 30 into the adaptor body 10 with more convenience.

Although a few preferred embodiments of the present invention have been shown and described, it would be appreciated by those skilled in the art that changes may be made in this embodiment without departing from the principles and spirit of the invention, the scope of which is defined in the claims and their equivalents.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A disc accommodating adaptor comprising:

an adaptor body;

a disc holder, inserted into the adaptor body, supporting a disc;

elastic press means, extended from the disc holder, for elastically supporting the disc to prevent a movement of the disc until the disc holder is inserted into the adaptor body, said elastic press means comprising first and second elastic press sections; and releasing means for releasing the elastic press means when the disc holder is inserted into the adaptor body, said releasing means comprising first and second projections integrally formed with the first and second elastic press sections, and having inclined surfaces which have predetermined degrees of inclination.

2. The adaptor as claimed in claim 1, wherein the elastic press means is formed on opposite sides of the disc holder to press the disc toward a center of the disc.

3. The adaptor as claimed in claim 1, wherein the releasing means comprises:

a projection integrally formed on a leading edge of the elastic press means; and an intervening member, disposed in the adaptor body, pushing the projection outward by slidably contacting with the projection when the disc holder is inserted into the adaptor body to push the elastic press means outward from pressing the disc toward opposite sides of the disc.

4. The adaptor as claimed in claim 3, wherein the projection is formed with an inclined surface having a predetermined degree of inclination, and the intervening member includes a wedge-shape to push the projections outward by slidably contacting with the inclined surface of the projection.

5. The adaptor as claimed in claim 3, wherein the projection is formed with an inclined surface having a predetermined degree of inclination, and the intervening member has a cylindrical shape to push the projection outward by slidably contacting with the inclined surface of the projection.

6. The adaptor as claimed in claim 1, wherein the adaptor body comprises:

a spindle opening and an extended opening, defined on the adaptor body, allowing an optical pickup to access the disc by exposing some portions of the disc therethrough;

a shutter, slidably disposed with respect to the adaptor body, for selectively opening/closing the spindle opening and the extended opening; and a cover, disposed on a front opening of the adaptor body, preventing the separation of the disc holder from the adaptor body.

7. A disc accommodating adaptor comprising:

an adaptor body having a spindle opening and an extended opening;

a disc holder, inserted into the adaptor body, supporting a disc;

first and second elastic press sections, extended from the disc holder, elastically supporting the disc to prevent the movement of the disc until the disc holder is inserted into the adaptor body;

first and second projections integrally formed with the first and second elastic press sections, and having inclined surfaces which have predetermined degrees of inclination;

a wedge-shaped first intervening member, disposed on an inner side of the adaptor body, pushing the first projection outward by slidably contacting with the inclined surface of the first projection;

a cylindrical shaped second intervening member, disposed on another inner side of the adaptor body, pushing the second projection outward by slidably contacting with the inclined surface of the second projection;

a shutter, slidably disposed on the adaptor body, selectively opening/closing the spindle opening and the extended opening; and a cover covering a front opening of the adaptor body.

8. A disc accommodating adaptor comprising:

an adaptor body;

a disc holder, inserted into the adaptor body, supporting a disc;

elastic press means, extended from the disc holder, for elastically supporting the disc to prevent a movement of the disc until the disc holder is inserted into the adaptor body, said elastic press means comprising first and second elastic press sections; and releasing means for releasing the elastic press means when the disc holder is inserted into the adaptor body, said releasing means comprising first and second projections integrally formed with the first and second elastic press sections, and having inclined surfaces which have predetermined degrees of inclination;

locking means for holding the disc holder in a predetermined position with respect to the adaptor body; and unlocking means for unlocking the disc holder from the adaptor body.

9. The adaptor as claimed in claim 8, wherein the elastic press means is formed on opposite sides of the disc holder to press the disc toward a center of the disc.

10. The adaptor as claimed in claim 8, wherein the releasing means comprises:

a projection integrally formed on a leading edge of the elastic press means; and an intervening member, disposed in the adaptor body, pushing the projection outward by slidably contacting with the projection when the disc holder is inserted into the adaptor body to push the elastic press means outward from pressing the disc toward opposite sides of the disc.

11. The adaptor as claimed in claim 10, wherein the projection is formed with an inclined surface having a predetermined degree of inclination, and the intervening member has a wedge-shape to push the projections outward by slidably contacting with the inclined surface of the projection.

12. The adaptor as claimed in claim 10, wherein the projection is formed with an inclined surface having a predetermined degree of inclination, and the intervening member has a cylindrical shape to push the projection outward by slidably contacting with the inclined surface of the projection.

13. The adaptor as claimed in claim 8, wherein the locking means comprises:

a pair of elastic locking projections disposed on opposite sides of the disc holder to be elastically biased outward; and a pair of locking recesses defined in the adaptor body to correspond with the pair of elastic locking projections, respectively.

14. The adaptor as claimed in claim 13, wherein the unlocking means comprises a pair of pressing members disposed on opposite sides of the adaptor body, and the pressing members include protrusions to contact with the elastic locking projections of the disc holder after passing through the locking recesses, respectively.

15. The adaptor as claimed in claim 8, wherein the adaptor body comprises:

a spindle opening and an extended opening, defined on the adaptor body, allowing an optical pickup to access the disc by exposing some portions of the disc therethrough; and a shutter, slidably disposed with respect to the adaptor body, selectively opening/closing the spindle opening and the extended opening.

16. A disc accommodating adaptor comprising:

an adaptor body;

a disc holder, inserted into the adaptor body, supporting a disc;

elastic press means, extended from the disc holder, for elastically supporting the disc to prevent the movement of the disc until the disc holder is inserted into the adaptor body; and releasing means for releasing the elastic press means when the disc holder is inserted into the adaptor body;

locking means for holding the disc holder in a predetermined position with respect to the adaptor body, wherein the locking means comprises:

a pair of elastic locking projections disposed on opposite sides of the disc holder to be elastically biased outward; and a pair of locking recesses defined in the adaptor body to correspond with the pair of elastic locking projections, respectively; and unlocking means for unlocking the disc holder from the adaptor body, wherein the unlocking means comprises a pair of pressing members disposed on opposite sides of the adaptor body, and the pressing members include protrusions to contact with the elastic locking projections of the disc holder after passing through the locking recesses, respectively, wherein the disc holder includes a gripping supporting a disc and the adaptor body includes a spindle opening and an extended opening;

first and second elastic press sections, extended from the disc holder, elastically supporting the disc so as to prevent movement of the disc until the disc holder is inserted into the adaptor body;

first and second projections integrally formed with the first and second elastic press sections, and having inclined surfaces which have predetermined degrees of inclination;

a wedge-shaped first intervening member, disposed on an inner side of the adaptor body, for pushing the first projection outward by slidably contacting with the inclined surface of the first projection;

a cylindrical shaped second intervening member, disposed on another inner side of the adaptor body, for pushing the second projection outward by slidably contacting with the inclined surface of the second projection;

a shutter, slidably disposed on the adaptor body, for selectively opening/closing the spindle opening and the extended opening; and a cover covering a front opening of the adaptor body.

17. The adaptor as claimed in claim 16, wherein the gripping section includes imprinted parts to indicate first and second sides of the disc to distinguish the first and second sides of the disc.

18. An adaptor for accommodating an information recordable/reproducible disc, the adaptor comprising:

at least one disc sensor hole used for determining a size of the disc;

elastic press means for elastically supporting the disc to prevent a movement of the disc, said elastic press means comprising first and second elastic press sections; and releasing means for releasing the elastic press means, said releasing means comprising first and second projections integrally formed with the first and second elastic press sections, and having inclined surfaces which have predetermined degrees of inclination.

19. The adaptor as claimed in claim 18, wherein the sensor hole is an A3 sensor hole.

20. The adaptor as claimed in claim 18, further comprising means for opening/closing the sensor hole according to the size and status of the disc.

21. The adaptor as claimed in claim 20, wherein the sensor hole is an A3 sensor hole.

22. The adaptor as claimed in claim 20, wherein the sensor hole opening/closing means comprises:
   a pair of movement rails formed in the adaptor body, and including the sensor hole;
   an opening/closing member slidably disposed in the movement rail to open/close the sensor hole; and
   means for holding the opening/closing member in a position to which the opening/closing member is moved.

23. The adaptor as claimed in claim 22, wherein the position holding means comprises:
   a position holding projection protruded from an upper one side of the opening/closing member;
   first and second position holding grooves, defined in the adaptor body, receiving the position holding projection, the first and second position fixing grooves being spaced apart from each other by a predetermined distance which corresponds with a traveling stroke of the opening/closing member; and
   a movement groove, defined on an upper other side of the opening/closing member, for moving the opening/closing member.

24. A disc accommodating adaptor comprising:
   an adaptor body;
   a disc holder, inserted into the adaptor body, supporting a disc;
   elastic press means, extended from the disc holder, for elastically supporting the disc to prevent a movement of the disc until the disc holder is inserted into the adaptor body, said elastic press means comprising first and second elastic press sections; and
   releasing means for releasing the elastic press means when the disc holder is inserted into the adaptor body, said releasing means comprising first and second projections integrally formed with the first and second elastic press sections, and having inclined surfaces which have predetermined degrees of inclination;
   at least one sensor hole, defined on the adaptor body in a predetermined position, used for determining the size of the disc which is accommodated in the adaptor body; and
   means for opening/closing of the sensor hole.

25. The adaptor as claimed in claim 24, wherein the elastic press means is formed on opposite sides of the disc holder to press the disc toward a center of the disc.

26. The adaptor as claimed in claim 24, wherein the releasing means comprises:
   a projection integrally formed on a leading edge of the elastic press means; and
   an intervening member, disposed in the adaptor body, pushing the projection outward by slidably contacting with the projection when the disc holder is inserted into the adaptor body to push the elastic press means outward from pressing the disc toward opposite sides of the disc.

27. The adaptor as claimed in claim 26, wherein the projection includes an inclined surface having a predetermined degree of inclination, and the intervening member has a wedge-shape to push the projections outward by slidably contacting with the inclined surface of the projection.

28. The adaptor as claimed in claim 26, wherein the projection includes an inclined surface having a predetermined degree of inclination, and the intervening member has a cylindrical shape to push the projection outward by slidably contacting with the inclined surface of the projection.

29. The adaptor as claimed in claim 24, wherein the adaptor body comprises:
   a spindle opening and an extended opening, defined on the adaptor body, allowing an optical pickup to access the disc by exposing some portions of the disc therethrough;
   a shutter, slidably disposed with respect to the adaptor body, selectively opening/closing the spindle opening and the extended opening; and
   a cover, disposed on a front opening of the adaptor body, preventing the separation of the disc holder from the adaptor body.

30. The adaptor as claimed in claim 24, wherein the sensor hole is an A3 sensor hole.

31. The adaptor as claimed in claim 24, wherein the sensor hole opening/closing means comprises:
   a pair of movement rails formed in the adaptor body, and including the sensor hole;
   an opening/closing member slidably disposed in the movement rail to open/close the sensor hole; and
   means for holding the opening/closing member in a position to which the opening/closing member is moved.

32. The adaptor as claimed in claim 31, wherein the position holding means comprises:
   a position holding projection protruded from an upper one side of the opening/closing member;
   first and second position holding grooves, deemed in the adaptor body, receiving the position holding projection, the first and second position fixing grooves being spaced apart from each other by a predetermined distance which corresponds with a traveling stroke of the opening/closing member; and
   a movement groove, defined on an upper other side of the opening/closing member, moving the opening/closing member.

33. A disc accommodating adaptor comprising:
   an adaptor body;
   a disc holder, inserted into the adaptor body, supporting a disc;
   elastic press means, extended from the disc holder, for elastically supporting the disc to prevent a movement of the disc until the disc holder is inserted into the adaptor body, said elastic press means comprising first and second elastic press sections; and
   releasing means for releasing the elastic press means when the disc holder is inserted into the adaptor body, said releasing means comprising first and second projections integrally formed with the first and second elastic press sections, and having inclined surfaces which have predetermined degrees of inclination;
   locking means for holding the disc holder in a predetermined position with respect to the adaptor body;
   a plurality of sensor holes, defined on the adaptor body in predetermined positions, determining a status of the disc which is received in the adaptor body;
   means for selectively opening/closing the sensor holes according to the determined status of the disc; and
   unlocking means for unlocking the disc holder from the adaptor body.

34. The adaptor as claimed in claim 33, wherein the elastic press means is formed on opposite sides of the disc holder to press the disc toward a center of the disc.

35. The adaptor as claimed in claim 33, wherein the releasing means comprises:
   a projection integrally formed on a leading edge of the elastic press means; and
   an intervening member, disposed in the adaptor body, pushing the projection outward by slidably contacting with the projection when the disc holder is inserted into the adaptor body to push the elastic press means outward from pressing the disc toward opposite sides of the disc.

36. The adaptor as claimed in claim 35, wherein the projection includes an inclined surface having a predetermined degree of inclination, and the intervening member has a wedge-shape to push the projections outward by slidably contacting with the inclined surface of the projection.

37. The adaptor as claimed in claim 35, wherein the projection includes an inclined surface having a predetermined degree of inclination, and the intervening member has a cylindrical shape to push the projection outward by slidably contacting with the inclined surface of the projection.

38. The adaptor as claimed in claim 33, wherein the locking means comprises:
   a pair of elastic locking projections formed on opposite sides of the disc holder to be elastically biased outward; and
   a pair of locking recesses defined in the adaptor body and corresponding to the pair of elastic locking projections, respectively.

39. The adaptor as claimed in claim 38, wherein the unlocking means comprises a pair of pressing members disposed on opposite sides of the adaptor body, and the pressing members have protrusions to contact with the elastic locking projections of the disc holder after passing through the locking recesses, respectively.

40. The adaptor as claimed in claim 39, wherein the disc holder is formed with a gripping section, and the adaptor body is formed with an opening on a front side thereof to position the gripping section outside the adaptor body,
   whereby the disc holder is easily detached from the adaptor body by pulling the gripping section of the disc holder manually, while pressing the pressing members formed on opposite sides of the adaptor body.

41. The adaptor as claimed in claim 40, wherein the gripping section includes imprinted parts to indicate first and second sides of the disc to distinguish the first and second sides of the disc.

42. The adaptor as claimed in claim 41, wherein the adaptor body includes a first and second sides indicating part to distinguish an inserting direction of the disc holder into the adaptor body.

43. The adaptor as claimed in claim 33, wherein the plurality of sensor holes comprises:
   an A1 sensor hole used for determining whether to proceed to a recording surface verifying process of the disc when a recording process is performed;
   an A2 sensor hole used for determining whether the disc is single-sided or double-sided;
   an A3 sensor hole used for determining whether the disc is 8-cm in diameter; and
   an information prevention hole used for determining whether an information prevention function has been selected, wherein
   the A1 and A3 sensor holes are in the open-state, while the A2 sensor hole and the information prevention hole are in the closed-state, initially, so that a disc drive determines that the disc is a recordable disc having a diameter of 8-cm which requires the recording surface verification process.

44. The adaptor as claimed in claim 43, wherein the sensor hole opening/closing means is installed at the A1 and A3 sensor holes and/or the information prevention hole, respectively, and the sensor hole opening/closing means comprises:
   a movement rail formed in the adaptor, and including a corresponding sensor hole;
   an opening/closing member slidably disposed in the movement rail to selectively open/close the corresponding sensor hole; and
   means for holding the opening/closing member in the position to where the opening/closing member is moved.

45. The adaptor as claimed in claim 44, wherein the position holding means comprises:
   a position holding projection protruded from an upper one side of the opening/closing member; and
   first and second position holding grooves, defined in the adaptor body, receiving the position holding projection, the first and second position fixing grooves being spaced apart from each other by a predetermined distance which corresponds with a traveling stroke of the opening/closing member; and
   a movement groove, defined on an upper other side of the opening/closing member, moving the opening/closing member.

46. The adaptor as claimed in claim 33, wherein the adaptor body comprises:
   a spindle opening and an extended opening, defined on the adaptor body, allowing an optical pickup to access the disc by exposing some portions of the disc therethrough; and
   a shutter, slidably disposed with respect to the adaptor body, selectively opening/closing the spindle opening and the extended opening.

47. A method for driving an adaptor accommodating a recordable/reproducible disc, comprising:
   determining whether a disc size determining sensor hole of the inserted adaptor is open;
   determining that the adaptor accommodating a disc of a first diameter is inserted when the disc size determining sensor hole is open, while determining that a disc of a second diameter greater than the first diameter is inserted when the disc size determining sensor hole is closed;
   elastically supporting, by first and second elastic press sections, the disc to prevent a movement of the disc until the disc holder is inserted into the adaptor body; and
   releasing, by first and second projections integrally formed with the first and second elastic press sections and having inclined surfaces which have predetermined degrees of inclination, the elastic press sections.

48. An apparatus for driving an adaptor accommodating a recordable/reproducible disc inserted into a disc drive, comprising:
   a sensing switch to be selectively inserted into a disc size determining sensor hole of the adaptor so as to be turned on/off and transmit corresponding signals regarding open/closed states of the disc size determining sensor hole to determine a status of a disc after determining whether a disc size determining sensor hole of the inserted adaptor is open, to determine that the adaptor accommodating a disc having a first diameter is inserted when the disc size determining sensor hole is open, and to determine that a disc having a second diameter greater than the first diameter is inserted when the disc size determining sensor hole is closed, wherein the disc drive executes an information recording process and a reproducing process according to a status of the disc determined via the disc size determining sensor hole, wherein the disc is supported by first and second elastic press sections to prevent a movement of the disc and is disc is released by first and second projections integrally formed with the first and second elastic press sections and having inclined surfaces which have predetermined degrees of inclination.

49. A disc accommodating adaptor comprising:

an adaptor body;

a disc holder, inserted into the adaptor body, supporting a disc;

an elastic press, extended from the disc holder, elastically supporting the disc to prevent a movement of the disc until the disc holder is inserted into the adaptor body, said elastic press comprising first and second elastic press sections; and a release releasing the elastic press when the disc holder is inserted into the adaptor body, said release comprising first and second projections integrally formed with the first and second elastic press sections, and having inclined surfaces which have predetermined degrees of inclination.

50. The adaptor as claimed in claim 49, wherein the elastic press is formed on opposite sides of the disc holder to press the disc toward a center of the disc.

51. The adaptor as claimed in claim 49, wherein the release comprises:

a projection integrally formed on a leading edge of the elastic press; and an intervening member, disposed in the adaptor body, pushing the projection outward by slidably contacting with the projection when the disc holder is inserted into the adaptor body to push the elastic press outward from pressing the disc toward opposite sides of the disc.

52. A disc accommodating adaptor comprising:

an adaptor body;

a disc holder, inserted into the adaptor body, supporting a disc;

an elastic press, extended from the disc holder, elastically supporting the disc to prevent a movement of the disc until the disc holder is inserted into the adaptor body, said elastic press comprising first and second elastic press sections; and a release releasing the elastic press when the disc holder is inserted into the adaptor body, said release comprising first and second projections integrally formed with the first and second elastic press sections, and having inclined surfaces which have predetermined degrees of inclination.

a locker holding the disc holder in a predetermined position with respect to the adaptor body; and an unlocker unlocking the disc holder from the adaptor body.

53. The adaptor as claimed in claim 52, wherein the elastic press is formed on opposite sides of the disc holder to press the disc toward a center of the disc.

54. The adaptor as claimed in claim 52, wherein the release comprises:

a projection integrally formed on a leading edge of the elastic press; and an intervening member, disposed in the adaptor body, pushing the projection outward by slidably contacting with the projection when the disc holder is inserted into the adaptor body to push the elastic press outward from pressing the disc toward opposite sides of the disc.

55. A disc accommodating adaptor comprising:

an adaptor body;

a disc holder, inserted into the adaptor body, supporting a disc;

an elastic press, extended from the disc holder, elastically supporting the disc to prevent a movement of the disc until the disc holder is inserted into the adaptor body, said elastic press comprising first and second elastic press sections; and a release releasing the elastic press when the disc holder is inserted into the adaptor body, said release comprising first and second projections integrally formed with the first and second elastic press sections, and having inclined surfaces which have predetermined degrees of inclination, a locker holding the disc holder in a predetermined position with respect to the adaptor body;

a plurality of sensor holes, defined on the adaptor body in predetermined positions, determining a status of the disc which is received in the adaptor body;

an opening/closing controller selectively opening and closing the sensor holes according to the determined status of the disc; and an unlocker unlocking the disc holder from the adaptor body.

56. A disc accommodating adaptor comprising:

an adaptor body;

a disc holder, inserted into the adaptor body, supporting a disc;

a plurality of sensor holes, defined on the adaptor body in predetermined positions, determining a status of the disc which is received in the adaptor body;

an opening/closing controller selectively opening and closing the plurality of sensor holes according to the determined status of the disc;

an elastic press, extended from the disc holder, elastically supporting the disc to prevent a movement of the disc until the disc holder is inserted into the adaptor body, said elastic press comprising first and second elastic press sections; and a release releasing the elastic press when the disc holder is inserted onto the adaptor body, said release comprising first and second projections integrally formed with the first and second elastic press sections, and having inclined surfaces which have predetermined degrees of inclination.

57. The disc accommodating adaptor according to claim 56, wherein the plurality of sensor holes comprises an A1 sensor hole used for determining whether to proceed to a recording surface verifying process of the disc when a recording process is performed.

58. The disc accommodating adaptor according to claim 56, wherein the plurality of sensor holes comprises an A2 sensor hole used for determining whether the disc is single-sided or double-sided.

59. The disc accommodating adaptor according to claim 56, wherein the plurality of sensor holes comprises an A3 sensor hole used for determining whether the disc has a first diameter or a second diameter greater than the first diameter.

60. The disc accommodating adaptor according to claim 56, wherein the plurality of sensor holes comprises an information prevention hole used for determining whether an information prevention function has been selected.

61. The disc accommodating adaptor according to claim 56, wherein the plurality of sensor holes comprises:

an A1 sensor hole used for determining whether to proceed to a recording surface verifying process of the disc when a recording process is performed;

an A2 sensor hole used for determining whether the disc is single-sided or double-sided;

an A3 sensor hole used for determining whether the disc has a first diameter or a second diameter greater than the first diameter; and an information prevention hole used for determining whether an information prevention function has been selected, wherein the A1 and A3 sensor holes are in an open-state, while the A2 sensor hole and the information prevention hole are in a closed-state, initially, so that a disc drive determines that the disc is a recordable disc having the first diameter which requires the recording surface verification process.

* * * * *